(12) United States Patent
Masuo et al.

(10) Patent No.: US 8,688,898 B2
(45) Date of Patent: Apr. 1, 2014

(54) MEMORY DEVICE CONFIGURED TO EXECUTE PLURAL ACCESS COMMANDS IN PARALLEL AND MEMORY ACCESS METHOD THEREFOR

(75) Inventors: Yoko Masuo, Iruma (JP); Taichiro Yamanaka, Hino (JP); Hironobu Miyamoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 238 days.

(21) Appl. No.: 13/226,271

(22) Filed: Sep. 6, 2011

(65) Prior Publication Data

US 2012/0137051 A1  May 31, 2012

(30) Foreign Application Priority Data

Nov. 30, 2010  (JP) ................. 2010-266710

(51) Int. Cl.
*G06F 12/00*  (2006.01)

(52) U.S. Cl.
USPC .......................................... 711/103; 712/200

(58) Field of Classification Search
USPC .......................................... 711/103; 712/200
See application file for complete search history.

(56) References Cited

U.S. PATENT DOCUMENTS

| | | | |
|---|---|---|---|
| 7,941,730 B2 | 5/2011 | Ogawa et al. | |
| 2003/0126406 A1* | 7/2003 | Hammarlund et al. | 712/200 |
| 2003/0196025 A1* | 10/2003 | Dahlen et al. | 711/103 |
| 2007/0192527 A1 | 8/2007 | Ogawa et al. | |
| 2008/0098161 A1 | 4/2008 | Ito | |
| 2010/0106901 A1* | 4/2010 | Higeta et al. | 711/106 |
| 2011/0019153 A1 | 1/2011 | Lee et al. | |
| 2012/0158205 A1* | 6/2012 | Hinman et al. | 700/297 |

FOREIGN PATENT DOCUMENTS

| | | |
|---|---|---|
| JP | 2005-056144 | 3/2005 |
| JP | 2006-260273 | 9/2006 |
| JP | 2007-220210 A2 | 8/2007 |
| JP | 2008-123473 A2 | 5/2008 |
| WO | WO 2007/116476 | 10/2007 |

* cited by examiner

*Primary Examiner* — Hashem Farrokh
(74) *Attorney, Agent, or Firm* — Knobbe Martens Olson & Bear LLP

(57) ABSTRACT

According to one embodiment, a memory device includes a memory, a memory interface, a command generator, an access command returning module and a command progress manager. The memory interface accesses the memory in parallel in accordance with access commands. The command generator speculatively issues access commands to the memory interface. The access command returning module returns access commands already issued to the memory interface and unexecuted at a time of occurrence of an error, through corresponding purge responses. The command progress manager updates command progress management information such that the command progress management information indicates the oldest one of the unexecuted access commands. The command generator reissues the returned unexecuted access commands to the memory interface based on the updated command progress management information.

6 Claims, 4 Drawing Sheets

| | CH0 | | | | CH1 | | | | ... | CH15 | | | |
|---|---|---|---|---|---|---|---|---|---|---|---|---|---|
| | PL0 | | PL1 | | PL0 | | PL1 | | | PL0 | | PL1 | |
| | CL0 | CL1 | CL0 | CL1 | CL0 | CL1 | CL0 | CL1 | | CL0 | CL1 | CL0 | CL1 |
| PG0 | C000 | C001 | C002 | C003 | C010 | C011 | C012 | C013 | ... | C0F0 | C0F1 | C0F2 | C0F3 |
| PG1 | C100 | C101 | C102 | C103 | C110 | C111 | C112 | C113 | ... | C1F0 | C1F1 | C1F2 | C1F3 |
| ... | | | | | | | | | | | | | |
| PG63 | C3F00 | C3F01 | C3F02 | C3F03 | C3F10 | C3F11 | C3F12 | C3F13 | ... | C3FF0 | C3FF1 | C3FF2 | C3FF3 |

F I G. 2

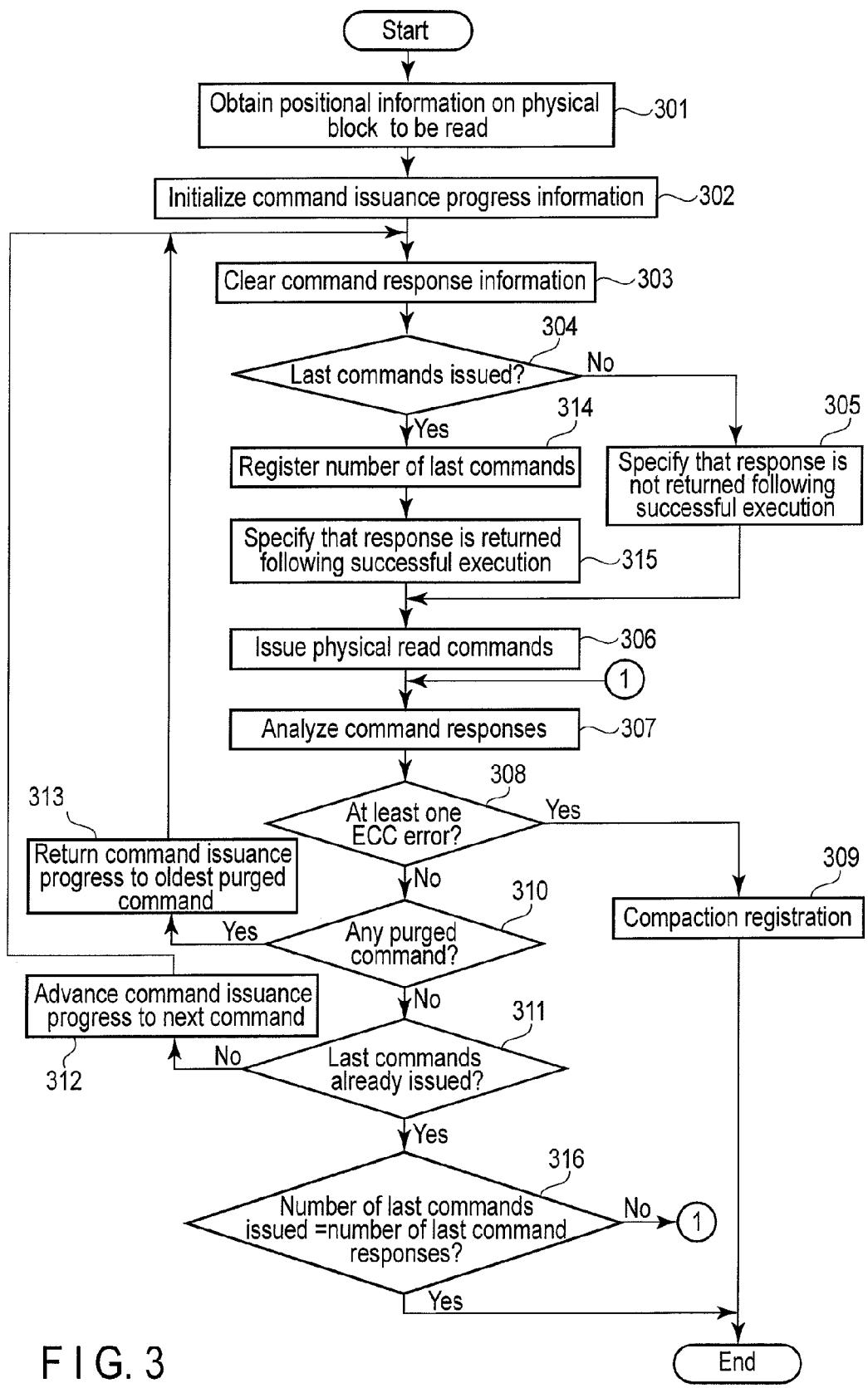
F I G. 3

MEMORY DEVICE CONFIGURED TO EXECUTE PLURAL ACCESS COMMANDS IN PARALLEL AND MEMORY ACCESS METHOD THEREFOR

CROSS-REFERENCE TO RELATED APPLICATIONS

This application is based upon and claims the benefit of priority from Japanese Patent Application No. 2010-266710, filed Nov. 30, 2010; the entire contents of which are incorporated herein by reference.

FIELD

Embodiments described herein relate generally to a memory device configured to execute a plurality of access commands in parallel and a memory access method for the memory device.

BACKGROUND

Memory devices are conventionally known which comprise a memory typified by a NAND flash memory and which execute a plurality of access commands in parallel. However, flash memories such as NAND flash memories are known to have a relatively low data retention capability. Thus, the quality of data stored in a flash memory may, for example, be degraded over time.

Hence, conventional memory devices with flash memories are appropriately checked for degraded quality of the data stored in the flash memory. The check involves read accesses and is carried out, for example, in units of blocks by a memory controller. If degraded quality is detected, the data in the corresponding block is rewritten to another block in the flash memory. Consequently, the data in the block detected to be degraded in quality is refreshed. This series of processes is called a patrol refresh process.

In the patrol refresh process, a plurality of access commands (read commands) are speculatively issued in order to gain efficient read access to the entire area of a block to be checked (patrolled). That is, succeeding access commands are issued before preceding access commands are completely executed. Thus, the memory controller is configured to record all the issued commands in order to deal with a possible error in read accesses carried out in accordance with the access commands. This is not limited to the patrol refresh process. Namely, the memory controller is configured to record all the access commands speculatively issued for increased operation speed in a read/write process intended for the entire area of the block.

Power to a memory device with a flash memory may be lost while the data in a block in the flash memory is being rewritten. In this case, the rewriting may fail to complete normally. Thus, memory devices are also known which are configured such that when the data in a block in the flash memory is to be rewritten, information indicative of the progress of the rewriting (rewrite progress information) is recorded. When the memory device is powered on again, the data in the block in which the rewrite failed to complete normally is recovered based on the information on the progress of the rewrite recorded at the time of the power shutdown.

As described above, the conventional memory device with a flash memory is configured to record all the access commands speculatively issued in the read/write process (memory access process) intended for the entire area of a block. Thus, the conventional memory device requires a memory area (that is a management area) in which all the access commands are recorded. This also applies to memory devices with memories other than the flash memory provided that the memory devices execute a plurality of speculatively issued access commands in parallel.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a diagram showing 4,096 access commands generated when a patrol refresh process is executed on a logical block, in association with pages, channels, planes, and clusters, according to the embodiment;

FIG. 3 is a flowchart illustrating a procedure for the patrol refresh process applied in the embodiment.

DETAILED DESCRIPTION

Various embodiments will be described hereinafter with reference to the accompanying drawings. In general, according to one embodiment, a memory device comprises a memory, a memory interface, a command generator, an access command returning module and a command progress manager. The memory interface is configured to access the memory in parallel in accordance with a plurality of access commands. The command generator is configured to speculatively issue a plurality of access commands to the memory interface in a predetermined access process for accessing the memory in units of blocks. The access command returning module is configured to return access commands already issued to the memory interface and unexecuted at a time of occurrence of an error, through corresponding purge responses, if the error occurs in any of memory accesses carried out by the memory interface in accordance with the plurality of access commands. The command progress manager is configured to manage progress of the access commands in the predetermined access process based on command progress management information retained by the command progress manager and to update the command progress management information such that the command progress management information indicates the oldest one of the unexecuted access commands if the unexecuted access commands have been returned. The command generator is further configured to reissue the returned unexecuted access commands to the memory interface based on the updated command progress management information.

Figure 1:
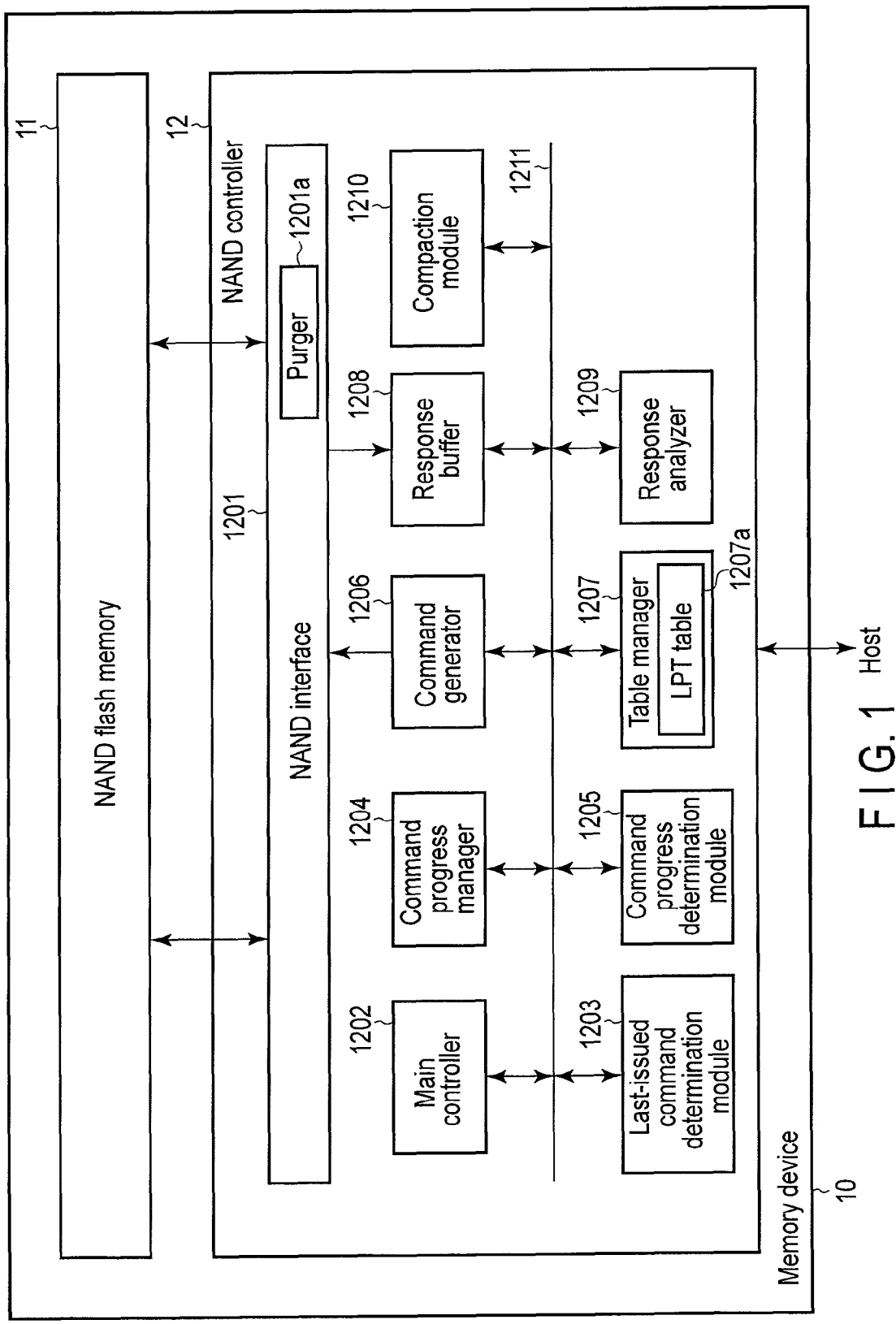
FIG. 1 is block diagram showing an exemplary configuration of a memory device according to an embodiment.

FIG. 1 is block diagram showing an exemplary configuration of a memory device according to an embodiment. In the embodiment, a memory device 10 shown in FIG. 1 is connected to, for example, a host (not shown in the drawings). The host uses the memory device 10 as a storage device of the host.

The memory device 10 comprises a NAND flash memory 11 and a NAND controller 12. The NAND flash memory 11 is a storage medium in which user data is stored. The NAND flash memory 11 comprises a plurality of NAND flash memory chips, and is configured to be accessible to the NAND controller 12 in accordance with a plurality of access commands in parallel. Instead of the NAND flash memory 11, a memory other than the NAND flash memory may be used provided that parallel accesses to the memory can be gained in accordance with a plurality of access commands.

The NAND controller 12 accesses the NAND flash memory 11 in accordance with a request from the host. The NAND controller 12 also accesses the NAND flash memory for a predetermined memory access process, for example, a patrol refresh process that is a memory access process carried out independently of the host.

The NAND controller 12 comprises a NAND interface 1201, a main controller 1202, a last-issued command determination module 1203, a command progress manager 1204, a command progress determination module 1205, a command generator 1206, a table manager 1207, a response buffer 1208, a response analyzer 1209, and a compaction module 1210. The main controller 1202, the last-issued command determination module 1203, the command progress manager 1204, the command progress determination module 1205, the command generator 1206, the table manager 1207, the response buffer 1208, the response analyzer 1209, and the compaction module 1210 are connected together by an internal bus 1211.

The NAND interface 1201 transmits and receives information between the NAND flash memory 11 and both the command generator 1206 and the response buffer 1208. The NAND interface 1201 accesses the NAND interface 1201 in accordance with a plurality of access commands issued by the command generator 1202 as described below.

The NAND interface 1201 comprises a purger 1201a. The purger 1201a is an access command returning module configured to return all unexecuted access commands to the response buffer 1208 through special responses (hereinafter referred to as purge responses) if an error occurs in execution of an access command. The purge response is a kind of command response.

The main controller 1202 controls the operation of each of the modules connected together via the internal bus 1211. The last-issued command determination module 1203 determines whether the number of command responses stored in the response buffer 1208 and used to provide notification of the result of execution of access commands is equal to the number of last commands (last access commands) issued to the NAND controller 12 as described below.

The command progress manager 1204 manages the progress of access commands (that is, the progress of issuance of access commands) speculatively issued to the NAND interface 1201 in order to process one logical block during an access process executed in units of logical blocks. The command progress manger 1204 retains command progress management information required to manage the progress of issuance of access commands (this information is hereinafter referred to as command issuance progress information). In the embodiment, the access process carried out in units of logical blocks is a patrol refresh process.

The command progress determination module 1205 determines whether to return the progress of issuance of access commands to the access commands purged by the purger 1201a in the NAND interface 1201. The command generator 1206 speculatively issues a plurality of access commands for accesses to the NAND flash memory 11, to the NAND interface 1201.

The table manager 1207 comprises a logical-to-physical address translation (LPT) table 1207a. In the embodiment, the LPT table 1207a is constructed in an area in a memory such as DRAM. When, for example, the patrol refresh process is carried out, the table manager 1207 translates a target logical block address into a physical block address based on the LPT table 1207a.

The response buffer 1208 is configured to store responses (hereinafter referred to as command responses) from the NAND interface 1201 to access commands issued to the NAND interface 1201 by the command generator 1206. Those of the command responses which provide notification of errors are sometimes referred to as error responses. The abode-described purge responses are also stored in the response buffer 1208 as command responses.

The response buffer 1208 has a FIFO structure constructed using, for example, a FIFO buffer. The response buffer 1208 is managed based on a write pointer and a read pointer. The write pointer indicates a position in the response buffer 1208 in which a command response returned by the NAND interface 1201 is to be stored. The read pointer indicates a position in the response buffer 1208 in which the next command response to be analyzed by the response analyzer 1209 is stored.

The response analyzer 1209 analyzes one of the command responses returned by the NAND interface 1201 and stored in the response buffer 1208 which is pointed to by the read pointer. Upon finishing analyzing the command response pointed to by the read pointer, the response analyzer 1209 advances the read pointer to point to the next position in the response buffer 1208.

Upon analyzing the error response returned by the NAND interface 1201 during the patrol refresh process, the response analyzer 1209 registers a logical block ID (identifier) indicative of a target logical block for the patrol refresh process, in the compaction module 1210. The compaction module 1210 carries out a compaction process based on the logical block ID registered by the response analyzer 1209. In the compaction process, the data in first physical blocks in the NAND flash memory 11 which are currently assigned to the logical block indicated by the logical block ID is written to second physical blocks in the NAND flash memory 11. After this rewrite, the physical blocks assigned to the logical block indicated by the logical block ID are changed from the first physical blocks to the second physical blocks.

Now, the operation of the memory device 10 according to the embodiment will be described taking the patrol refresh process as an example. First, in the embodiment, it is assumed that the memory device 10 operates under prerequisites (1) to (4).

(1) The command generator 1206 can simultaneously issue a plurality of access commands to the NAND interface 1201.

(2) The maximum number of access commands that can be simultaneously issued to the NAND interface 1201 by the command generator 1206 is set when the memory device 10 is started. In the embodiment, the NAND interface 1201 includes 16 channels CH0, CH1, . . . , CH15, and the command generator can simultaneously issue access commands for up to 16 channels.

(3) One logical block is formed of 64 pages PG0, PG1, . . . , PG63, and each access is intended for one cluster corresponding to a half page. Two clusters are denoted by CL0 and CL1.

(4) Each channel is connected to two planes PL0 and PL1. For each channel, 2 (planes)×2 (clusters) (that is, four) read processes (access processes) are carried out per page.

FIG. 2 is a diagram showing 4,096 (64×16×4) access commands $C_{000}$, $C_{001}$, $C_{002}$, $C_{003}$, $C_{010}$, $C_{011}$, $C_{012}$, $C_{013}$, . . . , $C_{3FF0}$, $C_{3FF1}$, $C_{3FF2}$, and $C_{3FF3}$ generated when a patrol refresh process is executed on a logical block. In FIG. 2, these 4,096 access commands are shown in association with pages PG0, PG1, ..., PG63, channels CH0, CH1, ..., CH15, and planes PL0 and PL2, and clusters CL0 and CL1. The subscript x (0, 1, ..., 3F) of access command $C_{xyz}$ is a one- or two-digit hexadecimal number indicative of a page PGx accessed.

The subscript y (0, 1, ..., F) of access command $C_{xyz}$ is a hexadecimal number indicative of a channel CHy through which access command $C_{xyz}$ is issued. The subscript z (0, 1, 2, or 3) of access command $C_{xyz}$ is a hexadecimal number indicating a combination of a plane and a cluster in channel CHy through which access command $C_{xyz}$ is issued, wherein z=0 indicates a combination of plane PL0 and cluster CL0; z=1, a combination of plane PL0 and cluster CL1; z=2, a combination of plane PL1 and cluster CL0; and z=3, a combination of plane PL1 and cluster CL1.

In the embodiment, the pages in the logical block are accessed in order of pages PG0, PG1, ..., PG63. Furthermore, four access commands $C_{xy0}$, $C_{xy1}$, $C_{xy2}$, and $C_{xy3}$ specifying that page PGx is accessed via channel CHy in the NAND flash memory 11 are executed in this order.

Now, a procedure for the patrol refresh process applied in the embodiment will be described with reference to the flowchart in FIG. 3. The patrol refresh process is carried out as a background process for an access process requested by the host. That is, the patrol refresh process is carried out during an interval (free time) between the access processes requested by the host. The patrol refresh process illustrated in the flowchart in FIG. 3 is intended for one logical block. Thus, if a plurality of logical blocks are patrolled, the patrol refresh process illustrated in the flowchart in FIG. 3 is repeated a number of times corresponding to the number of logical blocks to be patrolled.

The main controller 1202 indicates, to the table manager 1207, a logical block to be subjected to the patrol refresh process (that is, the logical block from which data is to be read). The table manager 1207 references the LPT table 1207a based on positional information on the indicated logical block from which data is to be read. Thus, the table manager 1207 obtains the positional information on a physical block to be read and assigned to the logical block to be read (block 301). The table manager 1207 retains the obtained positional information on the physical block. At this time, the table manager 1207 also obtains a pointer pointing to an entry in the LPT table 1207a which is required to translate the positional information (logical address) on the logical block to be read into positional information (physical address) on the physical block to be read.

Figure 4:
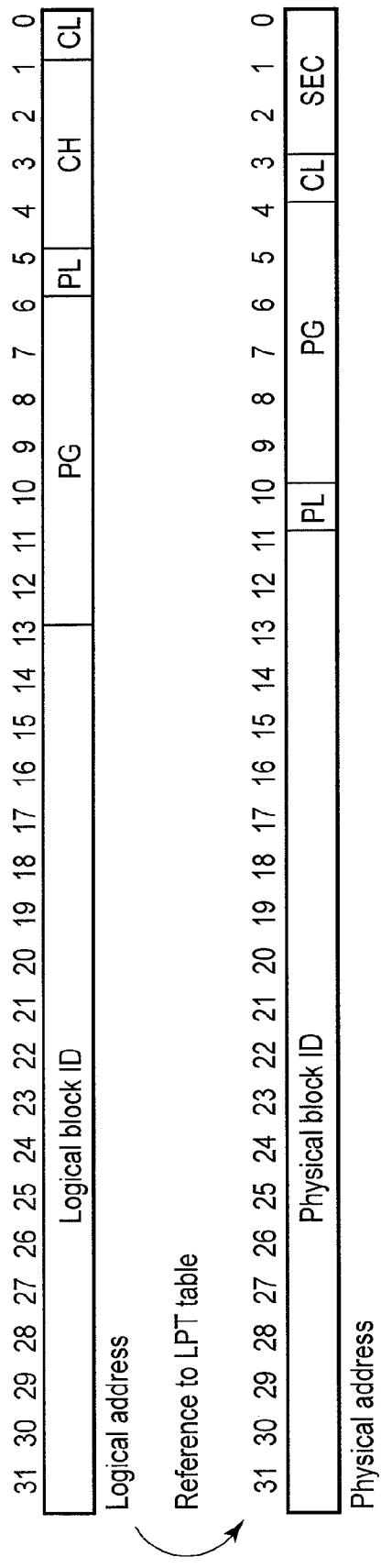
FIG. 4 is a diagram showing exemplary formats of a logical address and a physical address applied in the embodiment.

FIG. 4 shows an example of formats of a logical address and a physical address. The logical address comprises the logical block ID of the corresponding logical block, the page PG, the plane PL, the channel CH, and the cluster CL. In the embodiment in which the NAND flash memory 11 is used for the memory device 10, the logical address is also referred to as a logical NAND cluster address. The physical address comprises the physical block ID identifying the corresponding physical block, the plane PL, the page PG, the cluster CL, and a sector SEC. The physical address is also referred to as a physical NAND cluster address.

When block 301 ends, the command progress manager 1204 initializes command issuance progress information retained by the command progress manager 1204 (block 302). In the embodiment, the command issuance progress information indicates a physical position in the NAND flash memory 11 which is specified by the leading one of the next access commands to be issued. The command issuance progress information includes information indicative of the (page PG, plane PL, and cluster CL). In the embodiment, the initialized command issuance progress information indicates a physical position (PG0, PL0, and CL0)

When block 302 ends, the main controller 1202 discards all the command responses stored in the response buffer 1208 (block 303). That is, the main controller 1202 clears the contents of the response buffer 1208. As a result, no command response is stored in the response buffer 1208.

When block 303 ends, the command progress manager 1204 determines whether the access commands to be issued by the command generator 1206 are the last commands, based on the command issuance progress information retained by the command progress manager 1204 (block 304). That is, the command progress manager 1204 determines whether the last commands are to be issued. If the last commands are not to be issued (No in block 304) as in this example, the patrol refresh process proceeds to block 305.

In block 305, the command generator 1206 generates the access commands to be issued based on a physical position (page PG, plane PL, and cluster CL) indicated by the command issuance progress information retained by the command progress manager 1204. In block 305, the command generator 1206 further sets, for each of the generated access commands, first specification information indicating that no command response is returned if the access command is successfully executed.

Then, the command generator 1206 issues the access commands with the first specification information set therein to the NAND interface 1201 (block 306). In the patrol refresh process, the access commands issued to the NAND interface 1201 are read commands specifying reads. The access commands are hereinafter sometimes referred to as physical read commands. Here, the physical position indicated by the command issuance progress information is (PG0, PL0, and CL0). Thus, the leading physical read commands for the 16 channels shown in FIG. 2, that is, physical read commands $C_{000}$, $C_{010}$, ..., $C_{0F0}$, are simultaneously issued. Each of physical read commands $C_{000}$, $C_{010}$, ..., $C_{0F0}$ contains a physical address in the format shown in FIG. 4.

Physical read commands $C_{000}$, $C_{010}$, ..., $C_{0F0}$ simultaneously issued to the NAND interface 1201 by the command generator 1206 are stored in a command queue (not shown in the drawings) in the NAND interface 1201. If the command queue is not full, the command generator 1206 can issue the succeeding physical read commands for the 16 channels, that is, physical read commands $C_{001}$, $C_{011}$, ..., $C_{0F1}$, to the NAND interface 1201. That is, the command generator 1206 can speculatively issue the succeeding physical read commands until the command queue becomes full. At this time, physical read commands $C_{000}$, $C_{010}$, ..., $C_{0F0}$ are handled as commands older than the succeeding commands $C_{001}$, $C_{011}$, ..., $C_{0F1}$.

When the patrol refresh process is started, the NAND interface 1201 retrieves the 16 physical read commands $C_{000}$, $C_{010}$, ..., $C_{0F0}$ stored first in the command queue. Based on the retrieved physical read commands $C_{000}$, $C_{010}$, ..., $C_{0F0}$, the NAND interface 1201 accesses the NAND flash memory 11 via respective planes PL0 connected to the corresponding channels CH0, CH1, ..., CH15 in parallel.

Here, it is assumed that an error occurs in any of the read accesses based on physical read commands $C_{000}$, $C_{010}$, ..., $C_{0F0}$. In the embodiment, the error is detected based on, for example, an error correcting code (ECC) added to the read data and is therefore called an ECC error. If the ECC error occurs, the NAND interface 1201 returns an ECC error response to the response buffer 1208 as a command response corresponding to a physical read command specifying the read access in which the ECC error has occurred. The ECC error response (command response) returned to the response buffer 1208 is stored in the response buffer 1208.

Furthermore, the purger 1201a of the NAND interface 1201 returns all unexecuted commands stored in the command queue to the response buffer 1208 through a special command response (hereinafter referred to as a purge response) if an error occurs in any of the accesses being carried out in parallel via the 16 channels CH0 to CH15 as described above. In the embodiment, the purge response is returned after completion of all the physical read commands being executed in parallel with the access command in which the error has occurred. The embodiment ensures that issued physical read commands not returned by purge response have been executed regardless of whether or not an error has occurred.

As described above, the patrol refresh process is carried out in the background of the system. Thus, an access command for access requested by the host may be executed in parallel with the execution of a physical read command for patrol refreshing. In the embodiment, the purger 1201a of the NAND interface 1201 returns all the unexecuted commands to the response buffer 1208 through purge responses even if an error occurs in any access requested by the host.

On the other hand, if an error occurs in none of the read accesses based on physical read commands $C_{000}, C_{010}, \ldots, C_{0F0}$, the NAND interface 1201 avoids returning the command responses to the response buffer 1208. This is because the above-described first specification information set in physical read commands $C_{000}, C_{010}, \ldots, C_{0F0}$ specifies that the command responses are not returned when physical read commands $C_{000}, C_{010}, \ldots, C_{0F0}$ are successfully executed.

Thus, in the embodiment, when physical read commands $C_{000}, C_{010}, \ldots, C_{0F0}$ are successfully executed, the NAND interface 1201 avoids returning the corresponding command responses to the response buffer 1208. Thus, the NAND interface 1201 can quickly execute the succeeding physical read commands $C_{001}, C_{011}, \ldots, C_{0F1}$ stored in the command queue. However, the time required to execute physical read commands $C_{001}, C_{011}, \ldots, C_{0F1}$ generally varies depending on the corresponding planes of the corresponding channels CH0, CH1, . . . , CH15. Here, it is assumed that the execution of physical read command C000 has been normally completed earliest. In this case, the NAND interface 1201 retrieves physical read command C001 included in the succeeding physical read commands C001, C011, . . . , C0F1 stored in the command queue. Then, the NAND interface 1201 accesses the NAND flash memory 11 via plane PL0 connected to the corresponding channel CH0 based on the retrieved physical read command C001.

It is assumed that the NAND interface 1201, for example, returns a plurality of command responses, which are then stored in the response buffer 1208. Then, the response analyzer 1209 analyzes all the command responses stored in an area in the response buffer 1208 which starts at a position pointed to by the read pointer (block 307). When the NAND interface 1201 returns one command response, the response analyzer 1209 may start analyzing the returned command response.

The response analyzer 1209 determines whether the results of analysis of the command responses involve at least one ECC error response providing notification of an ECC error (block 308). If at least one ECC error response is included (Yes in block 308), the response analyzer 1209 registers the logical block ID of the logical block being processed, in the compaction module 1210 as a logical block to be subjected to the compaction process (block 309).

In contrast, if the results of analysis of the command responses involve no ECC error (No in block 308), the response analyzer 1209 determines whether the results of analysis of the command responses involve any of the purged access commands (block 310). That is, the response analyzer 1209 determines whether any purge response has been returned.

If the results of analysis of the command responses involve no purged access command (No in block 310), the command progress manger 1204 determines whether the last commands have been issued, based on the command issuance progress information retained by the command progress manager 1204 (block 311). If the last commands have not been issued (No in block 311), the command progress manager 1204 updates the command issuance progress information to indicate the next physical position (block 312). That is, the command progress manager 1204 updates the command issuance progress information to indicate a physical position in the NAND flash memory 11 which is indicated by the leading one of the next access commands (here, the physical read commands) to be issued (block 312).

When block 312 ends, the patrol refresh process returns to block 303. Thereafter, a process similar to that described above is continued. It is assumed that an error has occurred in an access requested by the host. In this case, the purger 1201a of the NAND interface 1201 returns each of all the unexecuted commands stored in the command queue to the response buffer 1208 through a purge response. That is, the purger 1201a purges all the unexecuted commands. It is assumed that the purged, unexecuted commands are physical read commands $C_{110}$ and $C_{1F0}$, included in physical read commands $C_{100}, C_{110}, \ldots, C_{1F0}$ for the 16 channels, and physical read command $C_{013}$, issued earlier than physical read commands $C_{110}$ and $C_{1F0}$.

As described above, when unexecuted (purged) physical read commands $C_{110}, C_{1F0}$, and $C_{013}$ are returned through purge responses, physical read commands $C_{110}, C_{1F0}$, and $C_{013}$ are included in the results of the response analysis carried out by the response analyzer 1209. As a result, the result of the determination in block 310 carried out by the response analyzer 1209 is Yes. Then, the response analyzer 1209 determines the oldest one of purged physical read commands $C_{110}$, $C_{1F0}$, and $C_{013}$ (block 313).

In block 313, the command progress manager 1204 updates the command issuance progress information retained by the command progress manager 1204 to indicate a physical position indicated by the determined oldest command. In the embodiment, the oldest one of purged physical read commands $C_{110}, C_{1F0}$, and $C_{013}$ is determined based on the LPT table 1207a of the table manager 1207 and the physical addresses specified by physical read commands $C_{110}, C_{1F0}$, and $C_{013}$. Here, physical read command $C_{013}$ is determined to be the oldest command. In this case, the command issuance progress information is updated so as to be indicative of the physical position (PG0, PL1, and CL1) specified by physical read command $C_{013}$. That is, in block 313, the command specifying the physical position indicated by the command issuance progress information is returned to the purged, oldest command.

When block 313 ends, the patrol refresh process returns to block 303. Thus, the contents of the response buffer 1208 are cleared. Then, based on the current command issuance progress information, the command progress manger 1204 determines whether the next access commands (or access command) to be issued are the last commands (or last command) (block 304). In the embodiment, the next access command to be issued is purged physical read command C013 as described below and is not the last commands (No in block 304). In this case, the patrol refresh process proceeds to block 305.

In block 305, the command generator 1206 generates the next access commands (or access command) to be issued. Here, unlike in the normal case, only the oldest one of the purged physical read commands (unexecuted commands), that is, physical read command $C_{013}$, is generated. In block 305, the command generator 1206 sets first specification information in the generated physical read command $C_{013}$. Then, the command generator 1206 issues physical read command $C_{013}$ with the first specification information set therein to the NAND interface 1201 (block 306).

Even while no command response is returned by the NAND interface 1201, the command generator 1206 can issue the succeeding physical read commands to the NAND interface 1201 unless the command queue in the NAND interface 1201 is full. Thus, after reissuing unexecuted physical read command $C_{013}$, the command generator 1206 issues the 16 physical read commands $C_{100}, C_{110}, \ldots, C_{1F0}$ succeeding the 16 physical read commands $C_{003}, C_{013}, \ldots, C_{0F3}$ including physical read command $C_{013}$ (blocks 305 and 306). Each of physical read commands $C_{100}, C_{110}, \ldots, C_{1F0}$ contains the first specification information. Furthermore, even if the NAND interface returns neither an error response nor a purge response, resulting in storage of no command response in the response buffer 1208, blocks 305 and 306 are carried out via blocks 307, 308, and 310 to 312.

Thereafter, it is assumed that a process similar to that described above is continued, resulting in the command issuance progress information indicating the physical position (PG63, PL1, CL1) (block 312). In this case, the next access commands to be issued are 16 physical read commands $C_{3F03}, C_{3F13}, \ldots, C_{3FF3}$. When the next access commands to be issued are the last commands as in this example (Yes in block 304), the patrol refresh process proceeds to block 314.

In block 314, the last-issued command determination module 1203 obtains the number (the last-issued command number) of the last access commands to be issued (that is, the last commands), from the command generator 1206. The last-issued command determination module 1203 then retains the last-issued command number obtained. Then, based on a physical position (PG63, PL1, CL1) indicated by the command issuance progress information retained by the command progress determination module 1205, the command generator 1206 generates the 16 physical read commands $C_{3F03}, C_{3F13}, \ldots, C_{3FF3}$ (block 315). In block 315, the command generator 1206 further sets, in each of the 16 physical read commands generated $C_{3F03}, C_{3F13}, \ldots, C_{3FF3}$, second specification information indicating that a command response is to be returned even if the command is successfully executed.

Then, the command generator 1206 issues the 16 physical read commands $C_{3F03}, C_{3F13}, \ldots, C_{3FF3}$, with the second specification information set therein to the NAND interface 1201 (block 306). Then, the response analyzer 1209 waits for the NAND interface 1201 to return a command response to the response buffer 1208. It is assumed that the command response is returned by the NAND interface 1201 and that the returned command response is stored in the response buffer 1208.

The response analyzer 1209 determines whether the command responses stored in the response buffer 1208 include any ECC error response (block 308). If the command responses stored in the response buffer 1208 include no ECC error response (No in block 308), the response analyzer 1209 determines whether the stored command responses include any purge response (block 310). If the stored command responses include no purge response (No in block 310), the command progress determination module 1205 determines whether the last commands have already been issued, based on the command issuance progress information retained by the command progress determination module 1205 (block 310). Blocks 308 and 310 may be executed in the order opposite to that described above.

If the last commands have already been issued (Yes in block 311) as in this example, the patrol refresh process proceeds to block 316. In block 316, the last-issued command determination module 1203 determines whether the number of last-issued commands retained by the last-issued command determination module 1203 (that is, the number of last commands issued) is equal to the number of command responses providing notification of successes (that is, normal completion) returned by the NAND interface 1201 in response to the issuance of the last commands (these command responses are hereinafter referred to as the last command responses) (block 316). In the embodiment, for the determination made by the last-issued command determination module 1203 (block 316), the response analyzer 1209 counts the number of last command responses currently stored in the response buffer 1208. The response analyzer 1209 notifies the last-issued command determination module 1203 of the number of last command responses counted.

The last-issued command determination module 1203 calculates the sum of the newly notified number of last command responses and the already notified number of last command responses (that is, the number of already returned last command responses) to be the number of last command responses hitherto returned. In the above-described block 316, the last-issued command determination module 1203 determines whether the number of last commands issued (the number of last-issued commands) is equal to the above-described calculated sum (that is, the number of last command responses hitherto returned).

If the number of last commands issued is not equal to the number of last command responses hitherto returned (No in block 316), the last-issued command determination module 1203 determines that any of the last commands is related to an unreturned command response. That is, the last-issued command determination module 1203 determines that the patrol refresh process is not completed. In this case, the patrol refresh process returns to block 307. Thus, the response analyzer 1209 waits for the next command response (the last command response corresponding to the last command) to be returned to the response buffer 1208.

In contrast, the number of last commands issued is equal to the number of last command responses hitherto returned (Yes in block 316), the last-issued command determination module 1203 determines that the patrol refresh process has completed normally. In this case, the last-issued command determination module 1203 ends the patrol refresh process.

According to the above-described embodiment, in the memory device 10 with the purger 1201a, an access process (here, the patrol refresh process) involving read accesses to the entire area of physical blocks assigned to a logical block can be managed based on the number of last-issued commands, command progress information, and command responses. In the embodiment, not all access commands speculatively issued for increased operation speed need to be recorded. This also applies to the command responses. Thus, the embodiment enables an increase in the speed of the memory access process carried out in units of blocks, with a reduction in the memory capacity required to implement the storage area in which the number of last-issued commands, the command progress information, and the command responses are stored, compared to the memory capacity required in the conventional art.

Furthermore, the embodiment eliminates the need to return a normal-termination response from the NAND interface 1201 to the response buffer 1208, in connection with the commands other than the last ones. Thus, the memory access process carried out in units of blocks can further be increased in speed in spite of a small-capacity memory area used for management.

In the embodiment, the memory access process carried out in units of blocks is the patrol refresh process. However, the memory access process carried out in units of blocks is not limited to the patrol refresh process. For example, a self-diagnosis process may be used which is also a memory access process executed in units of blocks. At least one embodiment described above can provide a memory device that can carry out a memory access process in units of blocks at a high speed based on management using a small-capacity memory area, as well as a memory access method for the memory device.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
   a memory;
   a memory interface configured to access the memory in parallel in accordance with a plurality of access commands;
   a command generator configured to:
      speculatively issue a plurality of access commands to the memory interface in a first access process for accessing the memory in units of blocks;
      set, in each of a plurality of next access commands to be issued, first specification information indicating that when the next access command to be issued fails in execution, a corresponding command response should be returned; and
      issue the access commands with the first specification information set therein to the memory interface, when the next access commands to be issued are other than last access commands in the predetermined access process;
   an access command returning module configured to return access commands which have already been issued to the memory interface, and which are unexecuted at a time of occurrence of an error, wherein the access command returning module is configured to return access commands through corresponding purge responses when the error occurs in a memory access by the memory interface in accordance with the plurality of access commands; and
   a command progress manager configured to:
      manage progress of the access commands in the first access process based on command progress management information stored by the command progress manager; and
      update the command progress management information to indicate the oldest one of the unexecuted access commands if the unexecuted access commands have been returned,
   wherein the command generator is further configured to reissue the returned unexecuted access commands to the memory interface based on the updated command progress management information.

2. The memory device of claim 1, wherein the command generator is further configured to:
   set, in each of the last access commands, second specification information indicating that a corresponding command response should be returned regardless of whether or not the last access command fails in execution; and
   to issue the last access commands with the second specification information set therein to the memory interface, when the next access commands to be issued are the last access commands.

3. The memory device of claim 2, further comprising a last-issued command determination module configured to determine whether the access process has ended based on whether a number of command responses corresponding to the last access commands with the second specification information set therein, and having been returned from the memory interface, is equal to the number of last access commands wherein the second specification information is set and which have been issued to the memory interface.

4. A method of executing a first access process of accessing a memory in units of blocks in a memory device comprising the memory and a memory interface, the memory interface configured to access the memory in accordance with a plurality of access commands in parallel, the method comprising:
   speculatively issuing a plurality of access commands to the memory interface;
   returning access commands which have already been issued to the memory interface, and which are unexecuted at a time of occurrence of an error, through corresponding purge responses, when the error occurs in any of memory accesses carried out by the memory interface in accordance with the plurality of access commands; and
   updating command progress management information for managing progress of the access commands in the first access process to indicate the oldest one of the returned unexecuted access commands;
   reissuing the returned unexecuted access commands to the memory interface based on the updated command progress management information;
   determining whether a plurality of next access commands to be issued are last access commands in the first access process;
   setting, in each of the next access commands to be issued, first specification information indicating that when the next access command to be issued fails in execution, a corresponding command response should be returned, when the next access commands to be issued are other than last access commands; and
   issuing the access commands with the first specification information set therein to the memory interface.

5. The method of claim 4, further comprising:
setting, in each of the last access commands, second specification information indicating that a corresponding command response should be returned regardless of whether the last access command fails in execution, when the next access commands to be issued are the last access commands; and
issuing the last access commands with the second specification information set therein to the memory interface.

6. The method of claim 5, further comprising determining whether the access process has ended based on whether a number of command responses corresponding to the last access commands with the second specification information set therein, and having been returned from the memory interface, is equal to the number of last access commands wherein the second specification information is set and which have been issued to the memory interface.

\* \* \* \* \*